United States Patent
Bell

[19]

[11] 3,900,794

[45] Aug. 19, 1975

[54] ELECTRONIC POWER METERING DEVICE

[76] Inventor: Gregory R. Bell, 1504 Prospect Ave., Redondo, Calif. 90254

[22] Filed: Feb. 25, 1974

[21] Appl. No.: 445,143

[52] U.S. Cl. .................................................. 324/142
[51] Int. Cl.² .................... G01R 7/00; G01R 11/32
[58] Field of Search ........................................ 324/142

[56] References Cited
UNITED STATES PATENTS

| 3,525,042 | 8/1970 | Nunlist et al. | 324/142 |
| 3,655,955 | 4/1972 | Brendle | 324/142 UX |
| 3,718,860 | 2/1973 | Kwast et al. | 324/142 |
| 3,780,273 | 12/1973 | Turrell | 324/142 X |

FOREIGN PATENTS OR APPLICATIONS

| 472,677 | 6/1969 | Switzerland | 324/142 |
| 801,200 | 12/1968 | Canada | 324/142 |

OTHER PUBLICATIONS

Ryerson, Power Measurement by Time-Division Multiplication, Instruments & Control Systems, pp. 95–97, January 1963.

Hamburg et al., An Electronic Wattmeter for Nonsinusoidal Low Power Factor Power Measurements, IEEE Transactions on Magnetics, September 1971, pp. 438–442.

Friedl et al., Portable Electronic Watthourmeter—Standard, Published version of lecture given during the September 1972 IEE metering conference in London, England, Paper No. 117.

Primary Examiner—Stanley T. Krawczewicz
Attorney, Agent, or Firm—Walter E. Johansen

[57] ABSTRACT

The invention is an electronic power-to-frequency converter for measuring the amount of electricity used by an electrical system. The power-to-frequency converter includes a current transformer for continuously sampling the instantaneous current through the electrical system, a voltage transformer for continuously sampling the instantaneous voltage at which the current is drawn, and an analog multiplier for electronically multiplying the samples of voltage and current.

9 Claims, 1 Drawing Figure

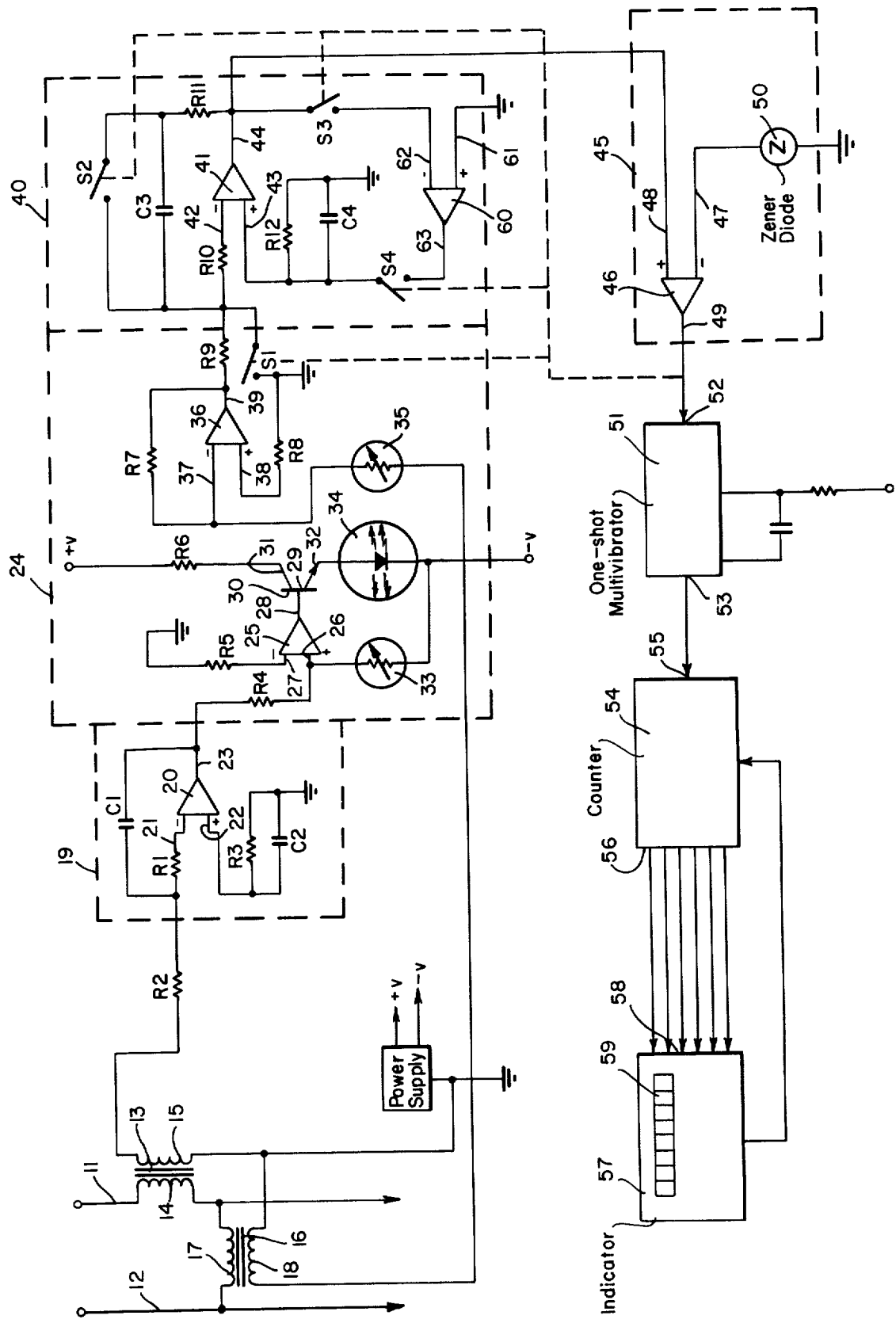

ELECTRONIC POWER METERING DEVICE

FIELD OF THE INVENTION

This invention relates to an electronic power metering device and more particularly to an electronic power-to-frequency converter for use in such a device.

STATEMENT OF THE PRIOR ART

In the prior art power meters are basically current metering devices, electromechanically coupled to an electrical system. In one such device for metering current there is a coil, which is attached to a needle and a support and suspended in a magnetic field. A current in the coil produces a torque which results in a deflection directly proportional to the instantaneous current. The high inertia of the movement which includes the coil, support and needle, prevents any rapid acceleration and the observed deflection is proportional to the average current. The movement of the needle is calibrated to provide the actual average current.

In another common ammeter the magnetic field is set up by the current itself and the torque is proportional to the square of the current.

Instantaneous power $p$ equals the product of the instantaneous voltage $v$ multiplied by the instantaneous current $i$. Power is measured by a wattmeter which is basically similar to the first current metering device mentioned above. In a commonly used wattmeter an instantaneous voltage $v$ applied to a voltage coil establishes a magnetic field, whose strength is directly proportional to the instantaneous voltage and an instantaneous current $i$, flowing into the current coil reacts with the magnetic field to produce a torque proportional to the instantaneous power p. The deflections of the needle are integrated mechanically and calibrated to indicate the amount of power used.

The above meters are all electromechanical devices and as such are not readily adaptable into integrated circuits.

John C. McDonald teaches an electronic voltage-to-frequency converter in his U.S. Pat. No. 3,631,342 entitled "Digital Voltmeter Apparatus Employing a Bipolar Amplifier Having a Unidirectional Output and a Voltage Controlled Oscillator", issued to him on Dec. 28, 1971. A first embodiment of the voltage-to-frequency converter when used as a voltmeter includes a bipolar amplifier coupled to a voltage controlled oscillator, which activates a gated counter, whose cumulative total may be read on an indicator. In a second embodiment the voltage controlled oscillator is replaced by an amplifier coupled in series to a multivibrator. The bipolar amplifier produces an amplified unidirectional output voltage of a single polarity directly proportional to the amplitude of an input signal to the bipolar amplifier. The electronic voltage converter is readily adaptable into an integrated circuit.

SUMMARY OF THE INVENTION

In view of the foregoing factors and conditions characteristic of the prior art, it is a primary object of the invention to provide a power-to-frequency converter which can be utilized in an electronic power metering device.

It is another object of the invention to provide a power-to-frequency converter which, along with attendant circuitry, can be readily adapted unto a single integrated circuit chip.

It is still another object of the invention to provide a power-to-frequency converter which operates in an electronic power meter thereby replacing the electromechanical device of the prior art for metering power used by an electrical system.

It is still another object of the invention to provide an electronic power metering device which is of such simple design that it is inexpensive to fabricate in large quantities.

In accordance with an embodiment of the present invention in a device for metering power used by an electronic system, a power-to-frequency converter includes an analog multiplier having two input terminals which multiplies a first input signal by a second input signal, a transformer connected in series with the electrical system for sampling the instantaneous current to provide the first input signal and a second transformer in parallel with the electrical system for sampling the instantaneous voltage to provide the second input signal.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figure.

DESCRIPTION OF THE DRAWING

FIG. 1 is a schematic drawing of an electronic power metering device in which a power-to-frequency converter is shown in accordance with the principles of the invention.

DESCRIPTION OF THE PREFERRED EMBODIMENT

The invention is used in an electronic device for metering power in an electrical system. The device operates by sampling both instantaneous line current, $i$, and instantaneous line voltage, $v$, multiplying the instantaneous current sample by the instantaneous voltage sample to obtain the instantaneous power which is defined by the equation, $p = vi$, and by integrating the instantaneous power $p$, over the period of use, which is designated by $T_u$. The period of use, $T_u$, is defined to be the time elapsed between the last power meter reading at time $t_o$ and the present power meter reading at time $t_N$.

In the general case of alternating current, the instantaneous current, $i$, is defined by the equation:

$$i = \sqrt{2}\, I \cos \omega t$$

where the factor $\omega$ is the frequency of the alternating current and the factor I is the value of the root of the mean squared current through the electrical system. The factor I varies with the different loads that it operates during the period of use, $T_u$, but it is relatively constant over a limited number of power cycles. The factor $\omega$ is a constant during the period of use, $T_u$, and as will be seen below is irrelevant in measuring the amount of electricity used by the electrical system. Similarly instantaneous voltage, $v$, is defined by the equation:

$$v = \sqrt{2}\, V \cos (\omega t + \theta)$$

where the factor $\theta$ is the phase angle and the factor V is the root of the mean squared voltage across the electrical system.

The instantaneous power, $p$, is therefore defined by the equations:

$p = vi = \sqrt{2} I \cos(\omega t) \cdot \sqrt{2} V \cos(\omega t + \theta)$ $p = 2VI \cos(\omega t) \cdot \cos(\omega t + \theta)$ from the trigonometric tables it is known that $2 \cos(A) \cdot \cos(B) = \cos(A-B) + \cos(A+B)$;

from the field of calculus it is known that where the term $\cos(2\omega t + \theta)$ is integrated over a cycle, $(2\pi/\omega)$, the integrated term equals zero. After the above manipulations of the equation, $p = vi$, it can be seen that the instantaneous power $p$ equals $VI \cos(\theta)$ and that the term $VI \cos(\theta)$ is constant over one cycle. The instantaneous power at a particular time, $t_j$, is designated as $p_j$ and is equal to the product of the instantaneous voltage $v_j$ multiplied by the instantaneous current $i_j$ at time $t_j$, this product being $V_jI_j \cos(\theta)$ where $V_j$ is the root of the mean squared voltage at time $t_j$ and $I_j$ is the root of the mean squared current at time $t_j$.

The power metering device measures the total amount of electrical energy used by the electrical system during the period of use, $T_u$. The electronic power metering device counts the number of times, N, the electrical system uses a quantized amount of energy, $e_j$, which is defined by the equation:

$e_j = (p_jT_j) = V_jI_jT_j \cos \theta = k$, a constant.

where $T = t_j - t_{j-1}$, and $t_0$ is the time of the last meter reading and $t_N$ is the time of the present meter reading, and the period of use $T_u$ is equal to $t_N - t_0$.

The total amount of electrical energy used by the electrical system is defined by the equation:

$$E = \sum_{j=0}^{N} e_j = Nk$$

where N is related to the period of use $T_u$ by the equation:

$$T_u = \sum_{j=0}^{N} T_j$$

From these equations it can be shown that the higher the power $P_j$ drawn by the electrical system, the shorter each time period $T_j$ is, which results in a higher number of cycle periods to reach time $t_N$.

The power-to-frequency converter is used in a device for metering electrical power carried by an electrical system. The electrical system includes a carrier line 11 and a neutral line 12. A current transformer 13 including a primary winding 14 and a secondary winding 15, has its primary winding 14 connected in series with the carrier line 11 in order to sample the instantaneous line current $i$ through the carrier line 11 and to provide a first input signal proportional to the instantaneous line current $i$. A voltage transformer 16, including a primary winding 17 and a secondary winding 18 has its primary winding 17 connected in parallel with the carrier line 11 and the neutral line 12 in order to sample the instantaneous line voltage v across the carrier line 11 and the neutral line 12 to provide a second input signal proportional to the instantaneous line voltage $v$.

A first integrator 19 consisting of a first operational amplifier 20 having a first input terminal 21, a second input terminal 22, and an output terminal 23, with the first input terminal 21 being coupled by a first resistor R1 in series with a second resistor R2 to the secondary winding 15 of the current transformer 13, and through the first resistor R1 by a first capacitor C1 to the output terminal 23 and the second input terminal 22 being coupled to ground through a third resistor R3 and a second capacitor C2 connected in parallel. It is necessary to include the integrator 19 because the first input sample having been sampled by an inductor is minus ninety degrees out of phase. The integrator 19 changes the phase angle of the first input signal by plus ninety degrees (i.e., the integral of $\cos \omega t$ is $\sin \omega t$ and $\sin(\omega t - 90°)$ equals $\cos \omega t$).

An analog multiplier 24, including a second operational amplifier 25 which has a first input terminal 26, a second input terminal 27, and an output terminal 28, has its first input terminal 26 coupled through a fourth resistor R4 to the output terminal 23 of the first operational amplifier 20 and has its second input terminal 27 coupled through a fifth resistor R5 to ground.

A transistor 29, having a base 30, first electrode 31, and a second electrode 32, has its base 30 connected to the output terminal 28 of the second amplifier 25. In the preferred embodiment of the invention, the first electrode 31 is a collector coupled through a sixth resistor R6 to a first voltage source of a predetermined polarity and magnitude and the second electrode 32 is an emitter.

A first photo variable resistor 33, the resistance of which varies with the intensity of the light shined on it, is coupled between a second voltage source of the opposite polarity, but of the same magnitude as the first voltage and the first input terminal 26 of the second operational amplifier 25.

A light source 34, which in the preferred embodiment of the present invention is a light emitting diode, is coupled between the second voltage source and the emitter 32 of the transistor 29 and is disposed a distance apart from and adjacent to the first photo variable resistor 33.

The analog multiplier 24 also includes a second photo variable resistor 35 which is coupled to the secondary winding 18 of the voltage transformer 16 and is disposed adjacent to and the same distance apart from the light source 34 as is the first photo variable resistor 33.

A third operational amplifier 36, having a first input terminal 37, a second input terminal 38, and an output terminal 39, has its first input terminal connected to the second photo variable resistor 35. The first input terminal 37 and the output terminal 39 are coupled by a seventh resistor R7 and the second input terminal is coupled through an eighth resistor R8 to ground. A ninth resistor R9 is connected to the output terminal 39 to impede any signal from feeding back into the output terminal 39 of the third operational amplifier 36.

In operation, the instantaneous line current $i$ off the carrier line 11 is sampled by the current transformer 13, which provides to the analog multiplier 24 the first input signal, which is minus 90° instantaneous out of phase with the instanteous current. The first integrator 19 adjusts the phase angle of first input signal by minus ninety degrees. The adjusted first input signal is applied to the first input terminal 26 of the analog multiplier 24 and activates the second operational amplifier 25 whose output activates the base 30 of transistor 29 which turns on the light source 34. The intensity of the light source 34 is directly proportional to the first input signal. The resistance of the first photo variable resistor 33 varies with the intensity of the light source 34; accordingly, it also varies directly with the first input signal. The resistance of first photo variable resistor 33 is controlled by the light source 34 and reaches a steady state value of resistance directly proportional to the first input signal. Since the second photo variable resistor 35 is exposed to the exact same intensity of light from the light source 34, it also is directly proportional to the first input signal.

The second input signal is applied to the second photo variable resistor 35 and is operated on by the third amplifier 36 which is controlled by the second photo variable resistor 35, the resistance of which is proportional to the first input signal.

The output of the third amplifier 36 is proportional to the product of the first input signal multiplied by the second input signal resulting in a voltage directly proportional to the instantaneous power ($p = vi$). A second integrator 40 which includes a fourth operational amplifier 41, having a first input terminal 42, a second input terminal 43, and an output terminal 44 integrates the output signal of the analog multiplier 24. The first input terminal 42 is coupled through a tenth resistor R10 in series with the ninth resistor R9 to the output terminal 39 of the third amplifier 36, and through a third capacitor C3 in series with an eleventh resistor R11 to the output terminal. The second input terminal is coupled to ground through a fourth capacitor C 4 and a twelfth resistor R12 in parallel. The voltage is summed in the second integrator 40.

A comparator 45 includes a fifth operational amplifier 46, having a first input terminal 47, a second input terminal 48, and an output terminal 49, coupled to a zener diode 50 having a predetermined zener voltage. The zener diode 50 couples the first input terminal 47 to ground. The zener diode 50 provides a reference voltage for the comparator 45. The output terminal 44 of the second integrator 40 is coupled to the second input terminal 48 of the comparator 45.

A one-shot multivibrator 51 having an input terminal 52, and an output terminal 53, has its input terminal 52 coupled to the output terminal 49 of the comparator 45. When the voltage level at the output terminal 44 of the second integrator 40 reaches a voltage of $V_z$, there is a signal at the output terminal 49 of the comparator 44 sufficient to trigger the one-shot multivibrator 50. A counter 54 having an input terminal 55 and an output terminal 56 has its input terminal 55 coupled to the output terminal 53 of the one-shot multivibrator 51. Each time the one-shot multivibrator is triggered the counter 54 is activated.

An indicator 57 having an input terminal 58 and a display panel 59 has its input terminal 58 coupled to the output terminal 56 of the counter 54, and indicates the number of times the one-shot multivibrator 51 has been triggered on the display panel 59.

After the comparator 45 has triggered the one-shot multivibrator 51, the second integrator 40 is nulled by a set of four switches electrically coupled to the comparator 45 and, operating simultaneously therewith. A first switch S 1, couples the output terminal 39 of the third amplifier 36 and the first input terminal 42 of the integrator 40 to ground. A second switch S 2 couples the output terminal 44 of the integrator 40 to ground.

A sixth operational amplifier 60 having a first input terminal 61, a second input terminal 62 and an output terminal 63 has its first input terminal 61 coupled to ground. A third switch S 3, couples the output terminal 44 of the integrator 40 to the second input terminal 62 of the sixth operational amplifier 60. A fourth switch S 4, couples the output terminal 63 of the sixth amplifier 60 to the second input terminal 43 of the second integrator 40. The second integrator 40 has been nulled to zero, the voltage proportional to instantaneous power begins to accumulate therein until the output voltage again reaches the reference voltage thereby repeating the cycle. The higher the instantaneous power, the faster the voltage output reaches the reference voltage. The number of times the comparator 45 triggers the one-shot multivibrator 51 over a period of time provides data enabling one to convert power to frequency.

Until the present invention there have been no electronic power-to-frequency converters for measuring power. The advantage of such a converter is that the measurement of power may be electronically integrated thereby providing an accurate indication of the amount of electricity used by an electrical system. The accuracy is enhanced because electromechanical coupling within the power metering device has been eliminated.

From the foregoing it can be seen that a power-to-frequency converter has been described. The converter is used as an electronic device for metering power through an electrical system. Additionally, it should be noted that the use of this converter eliminates the electromechanical coupling that is necessary in the above-mentioned prior art devices for metering electrical power. Furthermore, it should be noted that the electrical schematic is not drawn to scale and that the resistor value and the capacitor value of the schematic are not to be considered significant.

Accordingly, it is intended that the foregoing disclosure and showings made in the drawing shall be considered only as illustrations of the principles of the invention.

What I claim is:
1. In a device for measuring the power used by an electrical system, a power to frequency converter, comprising:
   a. voltage sensing means for sampling the instanteous voltage electrically coupled across the electrical system, said voltage sensing means having a voltage output that is proportional to and in phase with the instanteous voltage;
   b. current sensing means for measuring the instanteous current electrically coupled in series with the electrical system, said current sensing means having a voltage output that is proportional to and in phase with the instanteous current;
   c. electronic multiplication means for electronically multiplying the voltage outputs of said voltage sensing means and said current sensing means, said electronic multiplication means being electrically coupled to said voltage sensing means and said current sensing means and having a voltage output that is proportional to and in phase with the instanteous power;
   d. integrating means for accumulating the voltage output of said electronic multiplication means, electrically coupled to said electronic multiplication means, said integrating means having a voltage output that is proportional to the amount of power used by the electrical system over a period of time;
   e. reference means for providing a reference voltage;

f. comparator means for comparing the voltage output of said integrator means to the reference voltage, electrically coupled to said integrating means and to said reference means, said comparator means also providing a voltage signal when the output voltage of said integrating means reaches or exceeds the reference voltage; and g. nulling means for nulling the voltage output of said integrating means to zero volts when the voltage signal is received from said comparator means, electrically coupled to said comparator means and to said integrating means.

2. A power of frequency converter according to claim 1, wherein said reference means is a zener diode coupled to ground and wherein said nulling means comprises a one-shot multivibrator, electrically coupled to said comparator means and triggered by the voltage signal, and a set of four switches, electrically coupled to said comparator means, whose voltage signal closes said switches, each of said switches, being electrically coupled to said integrating means, providing a path to ground thereby nulling the voltage output of said integrating means to zero volts.

3. A power to frequency converter according to claim 2, wherein said current sensing means for sampling the instanteous current comprises:

a. a transformer having a first winding and a second winding, said first winding coupled in series to the electrical system; and b. means for changing the phase angle of the sample of current coupled to said second winding.

4. A power-to-frequency converter according to claim 3, wherein said means for changing the phase angle is an integrator comprising:

a. a first operational amplifier having an input terminal and an output terminal, said input terminal coupled to said second winding; and b. a first capacitor coupling said input terminal to said output terminal of said first operational amplifier.

5. A power to frequency converter as in claim 3, wherein said voltage sampling means for sampling the instanteous voltage comprises a second transformer having a first winding and a second winding, said first winding coupled in parallel to the electrical system.

6. A power to frequency converter according to claim 5, wherein said electronic multiplication means comprises:

a. a second operational amplifier having a first and a second input terminal and an output terminal;

b. a transistor having a base, a first and a second electrode, said first electrode being coupled to said output terminal;

c. a resistor coupling said second electrode to a first voltage source of a predetermined polarity and magnitude;

d. a light source coupling said third electrode to a second voltage source of the same magnitude and the opposite polarity as said first voltage source;

e. a photo variable resistor coupling the second voltage source to said second input terminal and disposed a distance apart from and adjacent to said light source; and f. a second photo variable resistor disposed adjacent to and an equal distance apart from said light source as said first photo variable resistor, and coupled to said second winding of said voltage transformer.

7. A power of frequency converter as in claim 6, wherein said output terminal of said third operational amplifier is coupled through a resistor to said integrating means for integrating the output signal of said operational amplifier, said integrating means comprising:

a. a fourth operational amplifier having an input terminal and an output terminal; and b. a capacitor coupling said input terminal to said output terminal of said fourth operational amplifier.

8. A power to frequency converter according to claim 7 wherein said output terminal of said fourth operational amplifier is coupled to said comparator means comprising:

a. a fifth operational amplifier having a first input terminal, a second input terminal, and an output terminal, said first input terminal coupled to said output terminal of said fourth operational amplifier; and b. said reference means coupled to said second input terminal.

9. A power-to-frequency converter according to claim 8 wherein said output terminal of said fifth operational amplifier is coupled to a one-shot multivibrator.

* * * * *